United States Patent
Goldfeder

(10) Patent No.: US 9,826,017 B1
(45) Date of Patent: Nov. 21, 2017

(54) SECURELY SERVING RESULTS OF DYNAMIC USER-PROVIDED CODE OVER THE WEB

(71) Applicant: Corey Goldfeder, Flushing, NY (US)

(72) Inventor: Corey Goldfeder, Flushing, NY (US)

(73) Assignee: Google Inc., Mountain View, CA (US)

( * ) Notice: Subject to any disclaimer, the term of this patent is extended or adjusted under 35 U.S.C. 154(b) by 418 days.

(21) Appl. No.: 13/791,231

(22) Filed: Mar. 8, 2013

Related U.S. Application Data

(60) Provisional application No. 61/642,030, filed on May 3, 2012.

(51) Int. Cl.
*H04L 29/08* (2006.01)
*G06F 21/56* (2013.01)

(52) U.S. Cl.
CPC ............ *H04L 67/02* (2013.01); *G06F 21/56* (2013.01); *G06F 21/563* (2013.01); *H04L 67/2814* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 5,463,753 A * | 10/1995 | Fry | ........................ | G06F 13/36 710/105 |
| 6,799,214 B1 * | 9/2004 | Li | ..................... | G06F 17/30902 707/E17.12 |
| 7,240,192 B1 * | 7/2007 | Paya et al. | ..................... | 713/152 |
| 7,640,347 B1 * | 12/2009 | Sloat | ................... | H04L 67/2842 709/203 |
| 7,702,917 B2 * | 4/2010 | Tevosyan et al. | ............ | 713/185 |
| 7,908,649 B1 * | 3/2011 | Arora | ................ | G06F 17/30902 726/7 |
| 8,224,986 B1 * | 7/2012 | Liskov | ................ | H04L 67/2814 709/238 |
| 8,667,143 B2 * | 3/2014 | Zhang | ................. | H04L 63/0892 709/227 |

(Continued)

FOREIGN PATENT DOCUMENTS

CA     2632159 A1 *  5/2007  ............. H04L 63/08

OTHER PUBLICATIONS

Ford, Sean, et al. "Analyzing and detecting malicious flash advertisements." Computer Security Applications Conference, 2009. ACSAC'09. Annual. IEEE, 2009.*

(Continued)

*Primary Examiner* — Scott B Christensen
*Assistant Examiner* — Lam Do
(74) *Attorney, Agent, or Firm* — Lowenstein Sandler LLP

(57) ABSTRACT

The disclosure relates to a system and method where a first user may submit untested or unverified code to a first server, which code may be accessed by a user via a browser. The first server provides results of the executed code to a second server via a redirect request. The redirected output is then sent from the second server back to the user's browser. For example, the results of the executed code can be returned to the user immediately without storage, such that malicious code embedded in a result of the executed code cannot access domain resources from the same domain as a URL associated with the executed code, and only the user requesting execution of the code can see the result.

20 Claims, 9 Drawing Sheets

(56) References Cited

U.S. PATENT DOCUMENTS

| | | | | |
|---|---|---|---|---|
| 8,713,092 | B2* | 4/2014 | Kumbalimutt | H04L 67/1006 709/203 |
| 8,819,819 | B1* | 8/2014 | Johnston et al. | 726/22 |
| 8,849,970 | B1* | 9/2014 | Everhart et al. | 709/223 |
| 2006/0112422 | A1* | 5/2006 | Tevosyan | H04L 63/0807 726/9 |
| 2006/0185021 | A1* | 8/2006 | Dujari | H04L 63/08 726/27 |
| 2007/0038637 | A1* | 2/2007 | Taneja | G06F 21/563 |
| 2007/0113282 | A1* | 5/2007 | Ross | G06F 21/52 726/22 |
| 2009/0019105 | A1* | 1/2009 | Sebastian | G06F 17/30887 709/202 |
| 2009/0150904 | A1* | 6/2009 | Champagne | G06F 13/387 719/313 |
| 2011/0126296 | A1* | 5/2011 | Moore | H04L 63/0807 726/28 |
| 2011/0145926 | A1* | 6/2011 | Dalcher | G06F 11/3466 726/26 |
| 2011/0252117 | A1* | 10/2011 | Sng | H04L 63/029 709/219 |
| 2012/0072605 | A1* | 3/2012 | Xu | H04L 63/0281 709/229 |
| 2012/0116873 | A1* | 5/2012 | Damm | G06Q 30/02 705/14.49 |
| 2012/0198234 | A1* | 8/2012 | Chung | H04L 9/3247 713/171 |
| 2012/0204250 | A1* | 8/2012 | Anderson | G06Q 10/107 726/9 |
| 2013/0138810 | A1* | 5/2013 | Binyamin | H04L 41/50 709/225 |
| 2013/0139264 | A1* | 5/2013 | Brinkley | G06F 21/566 726/24 |

OTHER PUBLICATIONS

Seifert, Christian, et al. "Identification of malicious web pages through analysis of underlying DNS and web server relationships." LCN. 2008.*

Hardt, Dick. "The OAuth 2.0 authorization framework." (2012).*

Stack Overflow, https://web.archive.org/web/20100816052841/http://stackoverflow.com/questions/3477333/what-is-the-difference-between-post-and-get, Aug. 16, 2010.*

Kymin, Jennifer, http://web.archive.org/web/20101126071025/http://webdesign.about.com/od/metataglibraries/f/what-is-a-meta-redirect.htm, Nov. 26, 2010.*

* cited by examiner

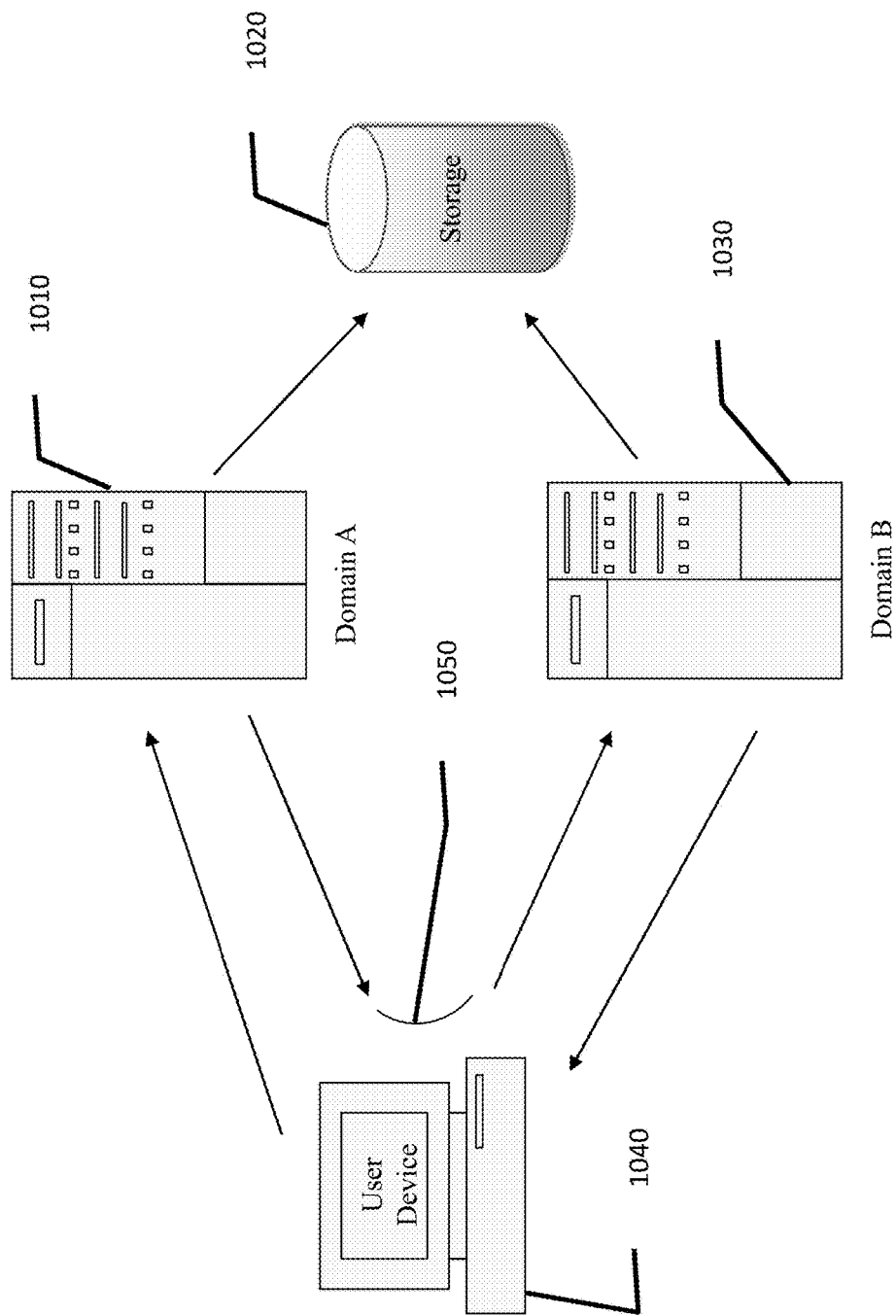

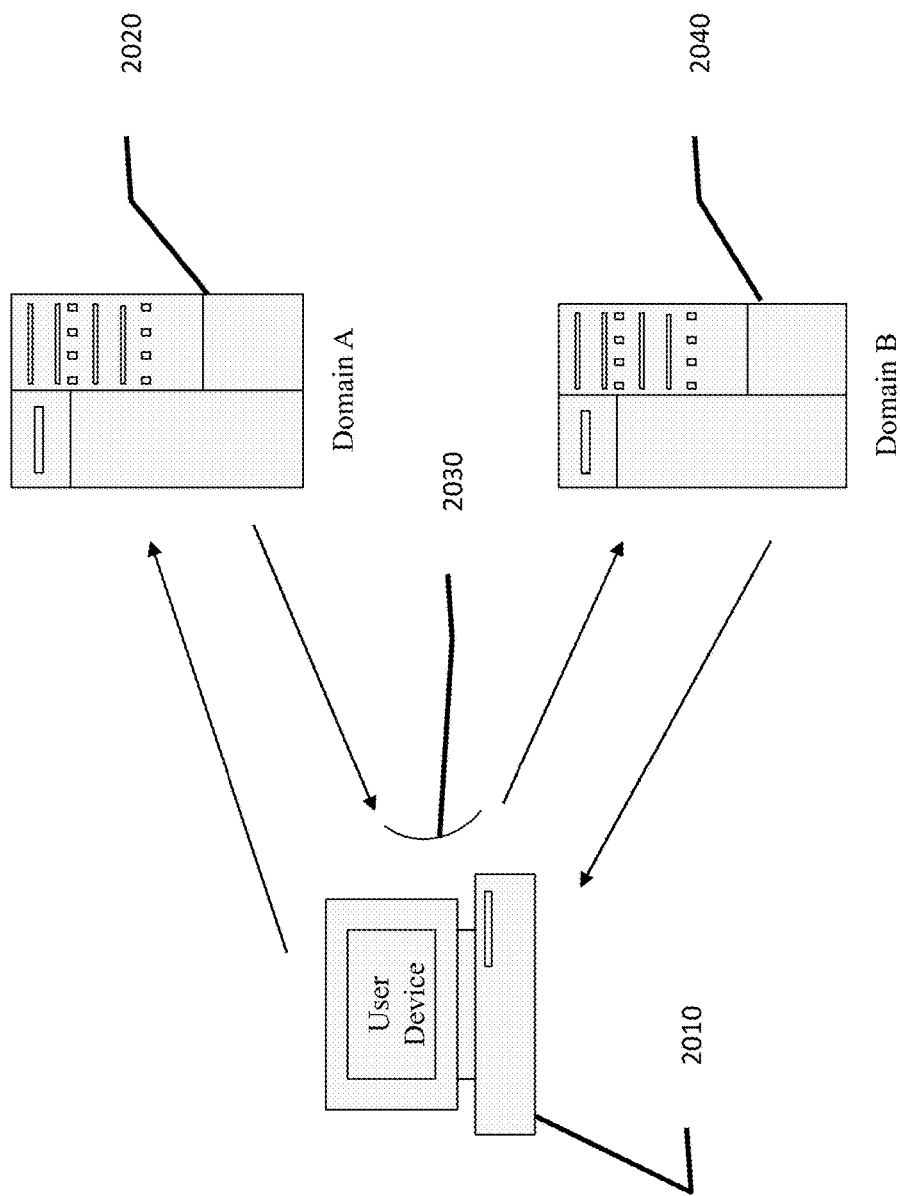

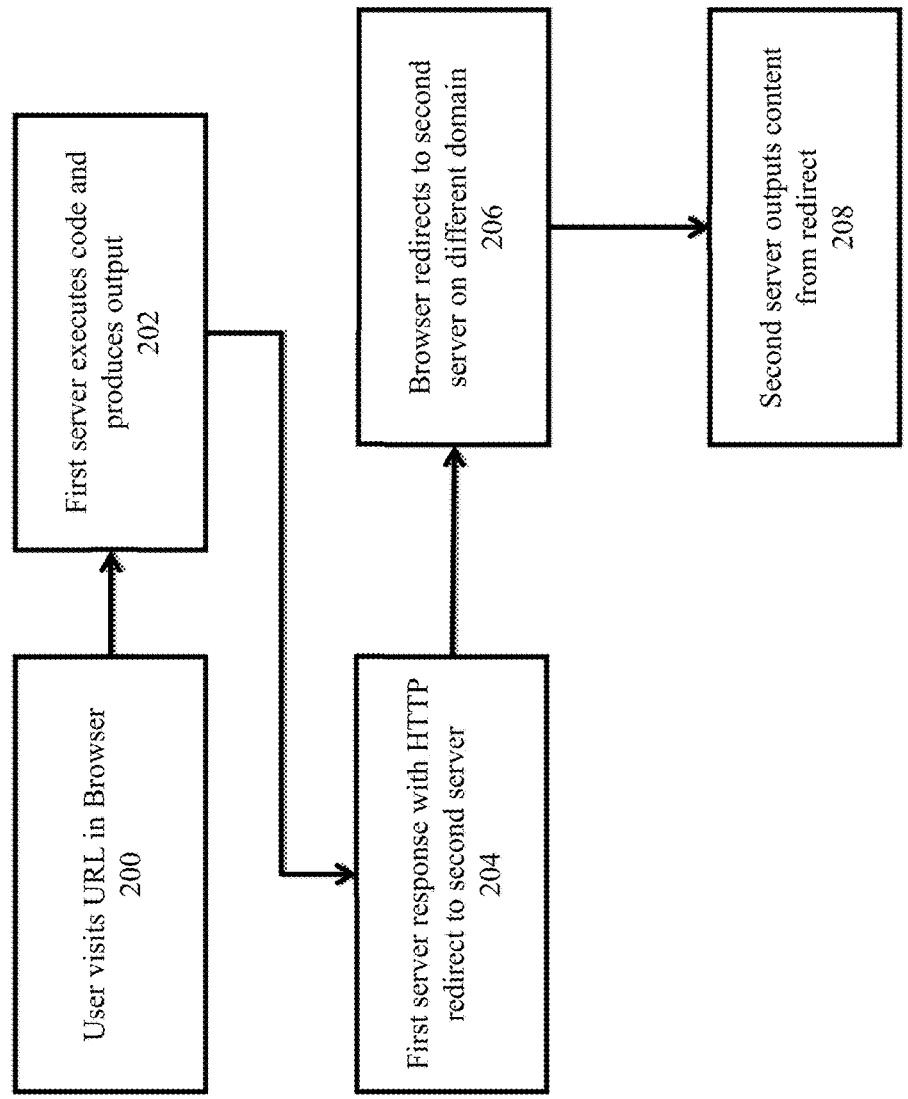

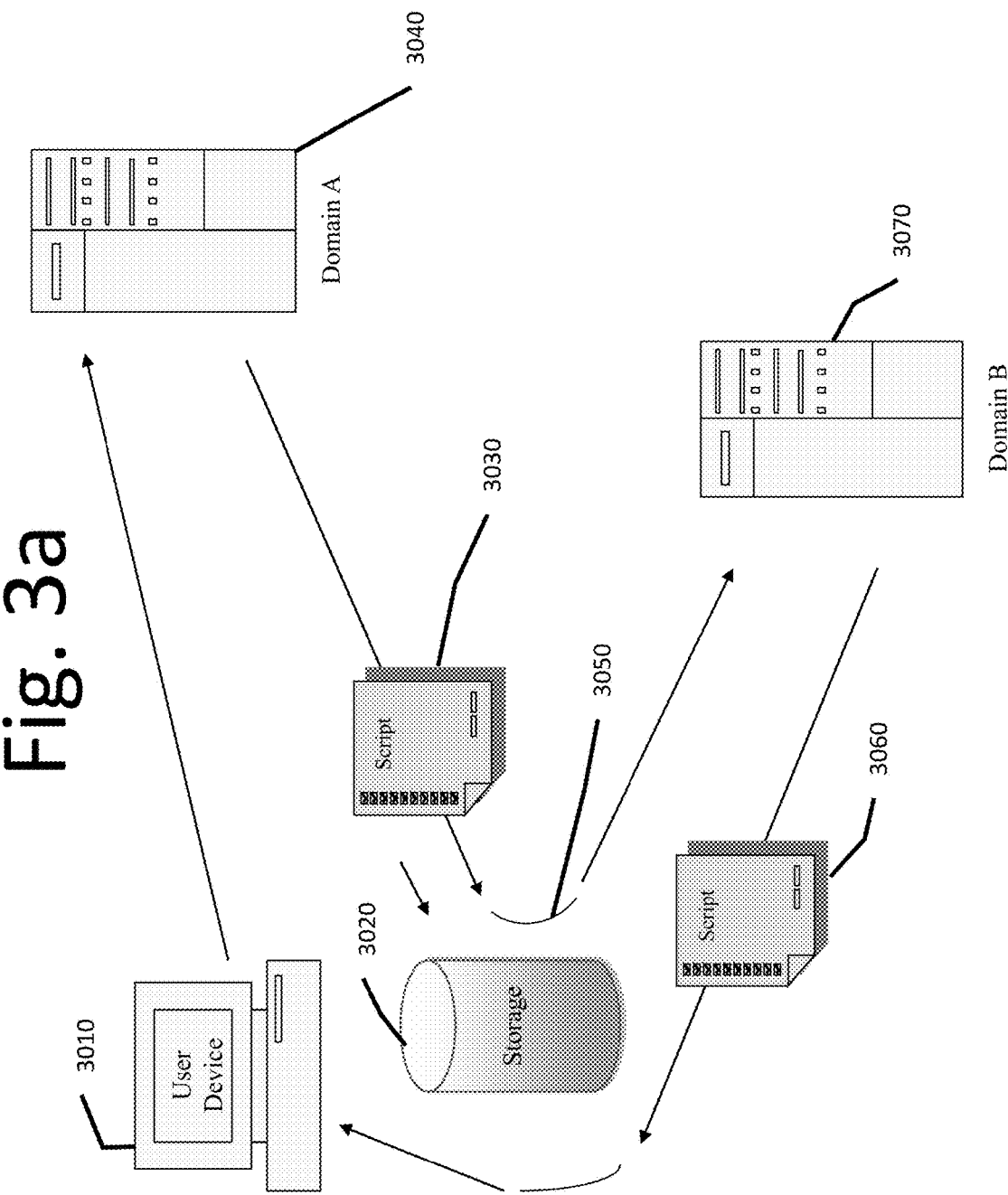

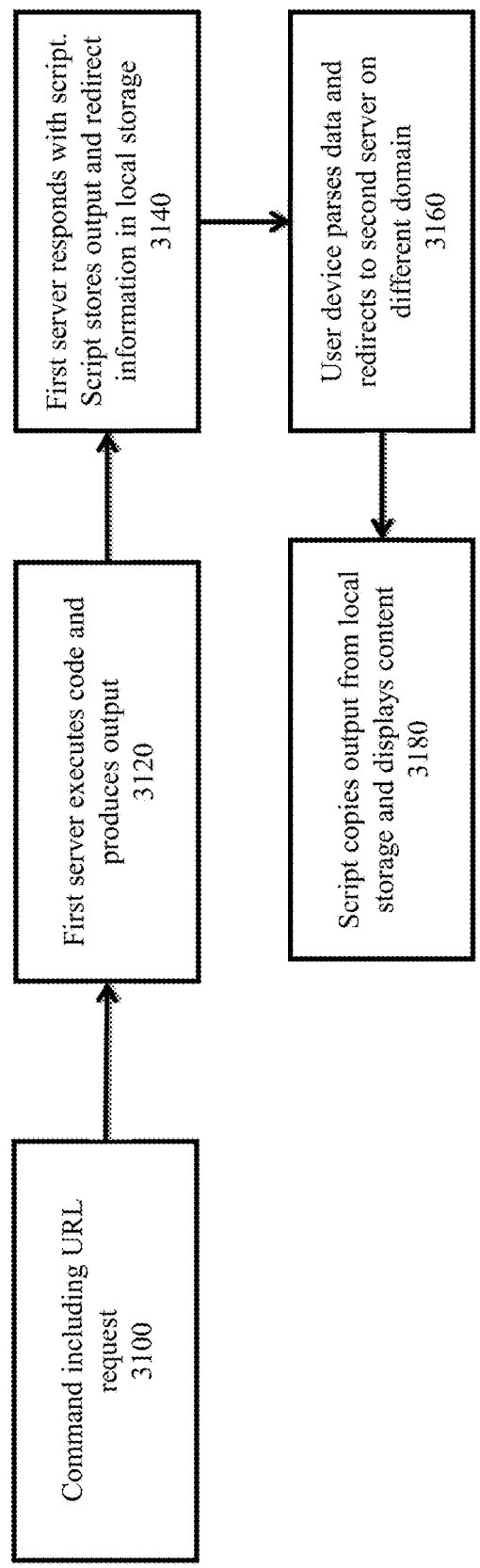

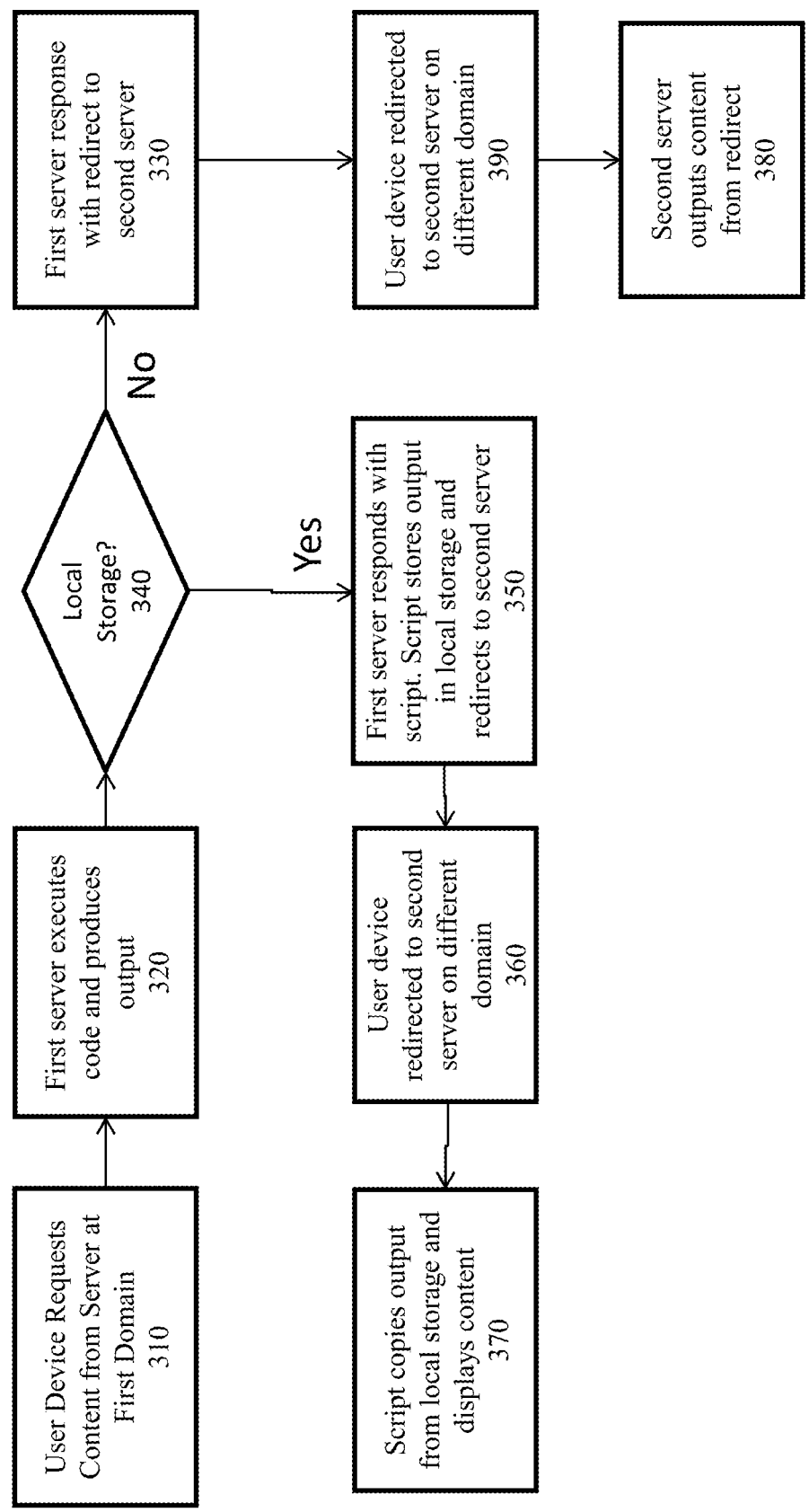

SECURELY SERVING RESULTS OF DYNAMIC USER-PROVIDED CODE OVER THE WEB

PRIORITY

The present application claims priority under 35 U.S.C. §119(e) to U.S. Patent Application 61/642,030, filed on May 3, 2012, the entire contents of which are hereby incorporated by reference.

BACKGROUND

When running unverified or untested third party code, infrastructure providers take protective steps to insulate or sandbox that code from potentially damaging the infrastructure or interfering with other applications running on the same platform.

When using web browsers, cookies are typically stored for websites that request data, such as state information, stored for future reference. This information in the cookie allows websites to persist in the browser, so that on return to the same website, for example, the user might not have to sign in again.

Cookie access permissions may be determined by the domain name portion of a URL, and pages served off of the same domain may be capable of accessing and modifying the same cookies. In contrast, pages served from a different domain may not have access to the cookies. Thus, for example, domain (domainX.com) properties such as DomainX Reader and DomainX Docs can be configured to have access to the same cookies and therefore share a common login experience, whereas, web pages served off of a different domain (domainY.com) will not be able to access these cookies (and vice versa). Maintaining this segregation of cookies helps to protect end user privacy and overall security.

Accordingly, third party code that can send a response back to the end user presents various potential problems such as, if the URL at which the code can be invoked is on a domain that has cookies. For example, a script may allow third party code to be run by visiting a URL on the script.domain.com domain and to produce output that is shown in the browser when the code has finished executing. In this way, an author of malicious code could construct a program that resulted in an output containing a script that would read or modify cookies from the domain.com domain Several approaches are currently used to allow third party code to return results to a browser without compromising the security of the domain's cookies. In one approach, the code is restricted to "allowed" operations or outputs. For example, the code may be limited to specifically allowed strings such as "success" or "failure" that don't allow for the possibility of embedded scripts. Other approaches allow code results or outputs to show only as plain text, which disallows scripts (and potential threats), but also disallows any HTML formatting. Another, less restrictive platform, limits code results to JSON and RSS formats, and presumably validates the results to ensure that no untrusted script content can be embedded such that is may be executed. Yet another approach allows for structured code results that are interpreted and run as an AJAX web application, while preserving cookie security because it does not allow the code author to embed arbitrary scripts.

Another approach is to allow the executable code to produce results or effects that attempt to access domain resources (e.g. cookies), and redirect the end user's browser to a URL on a different domain that does not include any accessible domain resources (e.g. one with cookies to be read).

In the illustrated Prior Art embodiment of FIG. 1, redirection can be performed by having two servers 1010, 1030, one on a primary domain (Domain A) and one on a secondary domain (Domain B), both of which may be connected to the same backend storage system 1020. When a user device 1040 accesses a web page or URL on the primary domain (Domain A) that is set up to execute third party code, the result of that code is saved to the backend storage 1020 with a unique key or token (not shown). The primary domain (Domain A) then responds, not with the output of the executed code, but with a redirect 1050 (for example, an HTTP redirect such as an HTTP response with a status code in the 301 to 307 range) that references a new URL on the secondary domain (Domain B), and includes the unique key or token in the parameter string of the new URL. The browser on the user device 1040 automatically redirects to the new URL on the secondary domain (Domain B). In response, a first party program on the second domain (Domain B) looks up the unique key or token in the shared storage 1020 and produces the output from the original third party code. This output is then provided from the server at the second domain 1030 to the user device 1040. Once the content has been requested from the secondary domain (Domain B), it can be removed from the shared storage 1020.

As described above, a common solution is to temporarily store in storage 1020 the output of executed code, redirect the executed code to a server at a "safe" domain 1030, and have the "safe" domain serve the results from storage 1020. For example, with reference to the FIG. 1, when a user on a user device 1040 visits a URL in a browser, the user device is directed to a server 1010 at a primary domain (Domain A). The server 1010 at Domain A executes the third party code and produces an output. The output is stored in a storage 1020. The server 1010 at Domain A responds with a HTTP redirect 1050 to another server 1030 at a secondary domain (Domain B). Along with the redirect, a key or token is passed along to identify the output from storage 1020. The browser or application on the user device 1040 automatically redirects the output and key or token to the second server 1030 at Domain B. The server 1030 at Domain B uses the token to retrieve the output stored in the storage 1020, and presents the information back to the user device 1040 for display.

In the embodiment disclosed in FIG. 1, the server 1030 at Domain B is not stateless and must provide enough storage to hold all output that is pending waiting to be sent back to the browser at the user device. It is also imperative that the storage 1020 remain available between execution of the code and serving of the output. Additionally, and as described in the example, this system requires passing a unique key or token along with the redirect 1050 in order to identify which of the executed output in storage 1020 to return. Significantly, anyone with access to the key or token could have access to the output, thereby opening a third party to supply malicious code into the system.

In the case where executed third party code is to be served in a static manner, redirection may not be required. Instead, end users may be provided with a direct link to the secondary domain. However, in this scenario, the secondary domain does not have access to cookies from the primary domain, and thus no way to verify the end user that requested the original URL on the primary domain. The connection between execution of code on the primary domain and output from the secondary domain is therefore based on the unique key or token. In order to prevent users from seeing each other's output on the secondary domain that serves content based on the key or token, the key or token must be highly secure. This system also requires cooperation between servers on the primary and secondary domains, and is therefore vulnerable to the system on the first domain crashing (and potentially taking down the shared storage) between executing the third party code and serving it from the redirected URL. Moreover, the shared storage scenario can be problematic if the redirect request is lost (for example, if the end user closes the browser in between sending the initial request to the primary domain and receiving the redirected response).

SUMMARY OF THE DISCLOSURE

The present disclosure, through one or more of its various aspects, embodiments, and/or specific features or sub-components, provides various systems, servers, methods, media, and programs for interfacing codes, such as, for example, web scripts.

One embodiment disclosed herein may pertain to a method of providing a result of executed code from a first server at a first network domain to a requesting device over an information-exchange network, the method comprising: receiving, at the first server, a content request from the requesting device, the content request including a request for the result of the executed code; executing the code at the first server to produce an output that includes the requested result; redirecting the produced output to a second server at a second network domain by including the produced output as part of a redirection instruction sent to the requesting device by the server; and delivering the redirected produced output to the requesting device; where the second server operates independently of the first server.

In some embodiments of a method, the content request is an HTTP (hypertext transfer protocol) request for a URL (uniform resource locator) associated with a particular content item.

In some embodiments of a method, the redirect instruction includes redirection data that indicates a redirect along with information about where and how to access the requested result; and the step of delivering includes processing the redirection data and receiving the requested result based on the redirection data.

In some embodiments of a method, the step of delivering is performed by the second server and where the step of delivering includes examining the redirected produced output before sending the redirected produced output to the requesting device.

In some embodiments of a method, the requesting device is equipped with a local storage; and the step of redirecting the produced output includes sending a script that includes a representation of the produced output from the first server to the local storage; and the step of delivering the redirected produced output to the requesting device includes retrieving the produced output from the local storage for presentation on the requesting device.

In some embodiments of a method, the method further comprises: determining whether the requesting device is equipped with a local storage to store the produced output, where the step of determining is performed before the step of delivering; in response a determination that the requesting device is equipped with local storage to store the produced output, performing the step of redirecting by sending a script that includes a representation of the produced output from the server to the local storage; and performing the step of delivering the redirected produced output to the requesting device by retrieving the produced output from the local storage for presentation on the requesting device.

In some embodiments of a method, the step of redirecting the produced output is accomplished by producing an HTML page at the server and including a Meta-Refresh tag in the produced HTML page, the Meta-Refresh tag redirecting the requesting device to the second server.

In some embodiments of a method, the content request is an HTTP (hypertext transfer protocol) request for a URL (uniform resource locator) associated with a particular content item.

In some embodiments of a method, in response to a determination that the requesting device is not equipped with local storage to store the requested output, performing the step of redirecting the produced output by producing an HTML page at the server and including a Meta-Refresh tag in the produced HTML page, the Meta-Refresh tag redirecting the requesting device to the second server.

In some embodiments of a method, the step of redirecting is accomplished by posting the result of the executed code in a payload at the first server and redirecting the posted payload to the second server.

In some embodiments of a method, the second server examines the payload and returns the produced output to the requesting device as a response from the second network domain.

In some embodiments, some or all of the method steps described above and/or combinations of some of all of the method steps described above may be embodied as processor-executable instructions on a non-transitory computer-readable medium.

One embodiment disclosed herein may pertain to a system comprising: a processor; and a processor-readable memory having stored therein instructions which, when executed by the processor, cause the processor to perform a method of receiving a result of executed code from a first server at a first network domain at a requesting device over an information-exchange network, the method comprising: generating a content request from the requesting device to the first server, the content request including a request for the result of the executed code; redirecting the produced output of the first server to a second server at a second network domain by including the produced output as part of the redirection instruction sent to the requesting device by the server, where the produced output includes the requested result; and receiving the redirected produced output at the requesting device from the second server; where the second server operates independently of the first server.

In some embodiments of a system, the processor is disposed within a mobile computing device and where the content request is initiated by an application operating on the mobile computing device.

In some embodiments of a system, the processor and memory may be configured instead or in addition to store and carry out any or all of the method steps discussed above with respect to one or more method embodiments.

In some embodiments of a system, the processor-readable memory further includes local storage disposed within the requesting device; and the step of redirecting the produced output includes receiving a script that includes a representation of the produced output from the first server at the requesting device and storing the received strip in the local storage; and the step of receiving the redirected produced output at the requesting device includes receiving an instruction from the second server to retrieve the produced output from the local storage for presentation on the requesting device.

Further scope of applicability of the systems and methods discussed herein will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The present application is further described in the detailed description which follows, in reference to the noted plurality of drawings, by way of non-limiting examples of preferred embodiments of the concepts described and discussed herein, in which like characters represent like elements throughout the several views of the drawings.

FIG. 1 illustrates a prior art system in which shared storage is used when executing third party code.

FIG. 2a illustrates an exemplary embodiment of a system in which a data redirect is used in accordance with aspects of the disclosure.

FIG. 2b is an exemplary flow of a system in which a data redirect is used in accordance with aspects of the disclosure.

FIG. 3a illustrates another exemplary embodiment of a system in which a data redirect is used in accordance with aspects of the disclosure.

FIG. 3c is an exemplary flow of a system in which a data redirect is used in accordance with aspects of the disclosure.

FIG. 3d is an exemplary flow of a system in which a data redirect is used in accordance with aspects of the disclosure.

Figure 3B:
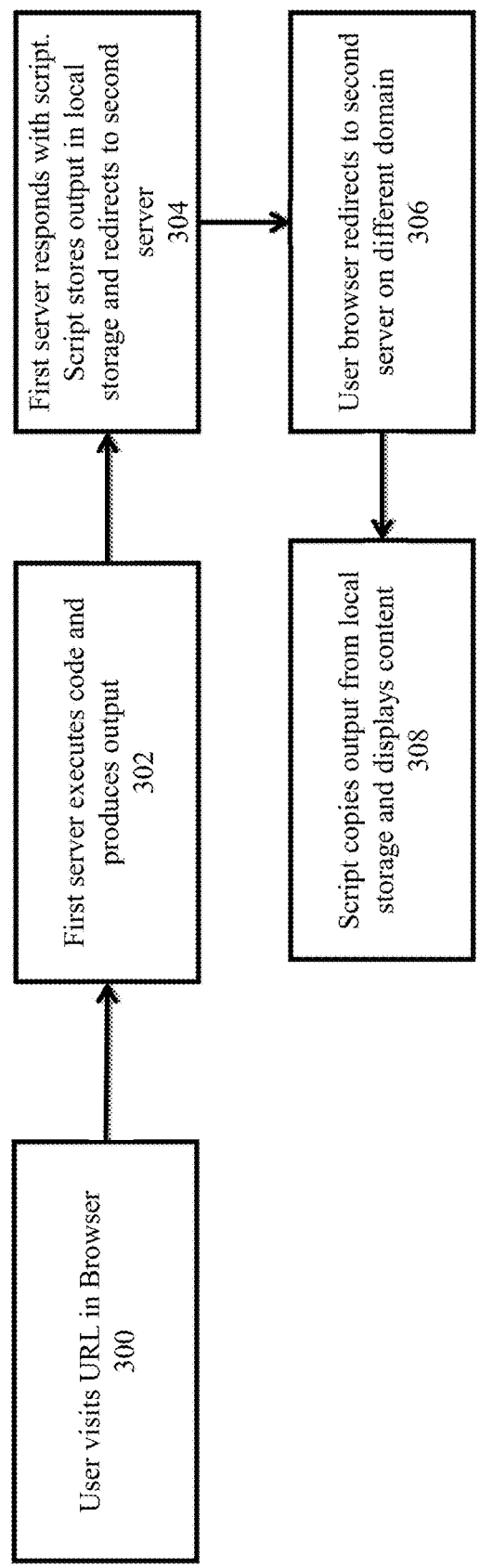
FIG. 3b is an exemplary flow of a system in which a data redirect is used in accordance with aspects of the disclosure.

The drawings will be described in detail in the course of the detailed description.

DETAILED DESCRIPTION

The present disclosure, through one or more of its various aspects, embodiments and/or specific features or sub-components, is thus intended to bring out one or more of the advantages as specifically noted below.

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

The disclosure is concerned with the security and safety of hosted internet software platforms, where users visit a URL in order to invoke an untested, untrusted or unverified third party program (that may also be malicious) that runs on the infrastructure.

It is appreciated that although reference is made to cookies throughout the described embodiments, the disclosure is not limited thereto. For example, the same considerations can be applied to HTML5 local and session storage, and other local resources. Similarly, although browser terminology is used throughout the description, the disclosure is not limited to browsers. Non-browser programs capable of requesting URLs, such as command line tools (for example, "wget" and "curl"), may also be used.

The disclosure relates to a system and method where a first user may submit unverified, potentially malicious, or untested code to a first server, which code may be accessed by a second user via a browser. The first server provides results of the executed code to a second server via a redirect request using a post to carry a payload representing, including or otherwise based on the code results. The redirected output, which includes the payload and the post, is then sent from the second server to the second user's browser. The results of the executed code can then be returned to the second user without storage, thereby preventing harmful or unexpected results such as, for instance, malicious code embedded in the results of the executed code accessing domain resources (e.g. cookies) from the same domain as a URL associated with the executed code. Moreover, only the user requesting execution of the code (e.g. script) has access to the output displayed in the browser. An alternative approach using local storage on the user's device is also detailed.

FIG. 2a illustrates an exemplary embodiment of a system in which a data redirect is used when executing third party code in accordance with aspects of the disclosure. The system disclosed in FIG. 2a, unlike the system illustrated in FIG. 1, uses a redirect method that does not require a shared backend storage or a unique key or token. The system of FIG. 2 includes, for example, an end user device 2010, a first server 2020 associated with a first domain (e.g., Domain A) and a second server 2040 associated with a second domain (e.g., Domain B).

Embodiments of a user device 2010 may include one or more of a smartphone, a laptop or desktop computer, a mobile computing device such as a tablet, a virtual machine being emulated or otherwise instantiated at a server or data center, and/or a shared or publicly accessible computing terminal or computing resource, or any other data processing and information display device or application through which a user may access an information exchange network such as, for example, the Internet.

Embodiments of a server 2020, 2040 may correspond to one or more physical and/or logical processing modules of the type described later in this document with respect to FIG. 4b. Such processing modules can include a circuit board, such as a motherboard, on which a variety of computer-related components are mounted to perform data processing. In some variations, a logical server may grow or shrink to occupy multiple and/or partial portions of a physical processing module. In such variations, some or all of the processing modules associated with a domain may be standardized or otherwise have known physical arrangements whereas a logical server created from one or more processing modules and/or from fragments/portions of a processing module may emulate hardware properties that are not otherwise physically present in the available hardware. A server 2020, 2040 may also be represented as a portion, combination, or aggregation of computing devices of the type described with respect to FIG. 4b later in this document.

Although FIG. 2a depicts an embodiment having a single end user device and two servers (and two domains), the system is not limited to such an embodiment. Any number of user devices, servers, storage devices, domains, etc. may comprise the system. Moreover, each of the client devices, servers, storage, etc. may be connected via a network, such as the Internet, a mobile data network, a private network, or other combinations and/or variations thereof.

FIG. 2b is an exemplary flow of the system in FIG. 2a in accordance with aspects of the disclosure. With reference to FIGS. 2a and 2b, when a user device visits or otherwise accesses a URL or other online resource in a browser 200 or in an application configured for network access, the user device is directed to a server 2020 at a primary domain (Domain A). The server 2020 at Domain A executes third party code and produces an output 202 which includes or otherwise indicates a result of the executable code. The server 2020 at Domain A responds with a redirect 2030, such as an HTTP redirect in the case of web browsing, to another server 2040 at a secondary domain (Domain B) 204. The redirect 2030 includes a result of the executed code as the payload, along with executable code that causes the browser or application on the user device 2010 to automatically redirect a request containing the payload to the second server 2040 at Domain B 206. The server 2040 at Domain B uses the redirected payload to present the information back in the browser on the user device 208.

In the exemplary flow of FIG. 2b on a system of the type shown in FIG. 2a, the redirect request 2030 from the primary domain (Domain A) encodes the result from the executed third party code that the secondary domain (Domain B) is supposed to respond with. Rather than fetching or retrieving the code result from a shared storage device (as explained with reference to FIG. 1), a program on the secondary domain (Domain B) can determine an output based on the code execution result included with the payload of the redirect request 2030. The program residing on the secondary domain (Domain B) is referred to herein as an "echo server" since it "echoes" back whatever payload is included with the redirect request 2030.

Significantly, there are many advantages to a system that uses a redirect methodology whereby the executed third party code result is sent with the payload. One advantage is that such a system is not dependent upon shared storage, allowing the various servers to operate completely independently and, in some cases, to be on different networks. For example, a program could execute on the primary domain and send a redirect request to the secondary domain without concern for whether any storage device fails. The secondary domain would still be able to produce the correct response to the end user's request even if storage fails since it is not dependent on such storage. Another advantage is that there is no unique key or token required. For example, since the secondary domain on the secondary ("echo") server outputs the information with the redirect request, it is not possible to provide a request that responds with the result from someone else's program execution (i.e. it is not possible to provide a request from an untrusted or unverified third party attempting to provide malicious code). Moreover, if the redirect request is made using HTTPs, it is not possible for a user to use the secondary server to "hijack" the result of another user's execution. Still another advantage is that the system is stateless as there is no intermediate state stored on the servers at either domain. That is, the primary domain (Domain A) executes the third party program, constructs the appropriate redirection request, and is finished. The second server (at Domain B) receives the redirect request, parses out the content that it is expected to respond with (i.e. the output), and then responds accordingly. By removing the need for intermediate storage, neither server needs to have any awareness of the other or any awareness of shared/mutually accessible resources.

Some communication and data format standards, such as the HTTP standard, may not provide an efficient, effective, or easy way to bundle potentially large amounts of content into a redirect response. HTTP, for example, redirects using a HTTP GET command, which limits the amount of parameter or data content (typically to several kilobytes). In order to provide a reliable redirection using HTTP from the primary domain to the secondary domain that carries along the output content, a combination of two HTML features may be used to produce the content-heavy redirect: (1) HTML Meta-Refresh tag, and (2)<form> tag. The HTML Meta-Refresh tag is interpreted by most browsers as an HTTP redirect. However, in contrast to an HTTP redirect, which is a response header that is not parsed by the browser as displayable content, a Meta-Refresh is part of the returned content (output) from the primary server. Therefore, a Meta-Refresh can include a timeout which specifies how long to wait before redirecting the browser. If the timeout is short (e.g., less than 4 or 5 seconds), the Meta-Refresh is generally treated as a permanent redirect (e.g., HTTP 302), which prompts the browser to redirect to the secondary domain if the user ever requests the original primary domain URL again. If, on the other hand, a Meta-Refresh has a delay of more than 4 or 5 seconds, it is generally treated as a temporary redirect (HTTP 303), which instructs the browser to make the request the next time the user visits the URL on the primary domain. Additionally, the <form> tag, which allows structured user input to be submitted to a server, is used. A form is prepopulated with data that the secondary ("echo") server needs to display, and the form is submitted using, for example, a web-based scripting language.

By combining these features, a trusted redirection request may be created that is capable of carrying a large amount of content. In operation, when a third party program is executed from a URL on the primary domain upon a request at the user device, the server on the primary domain responds with a HTML page. Included on the HTML page is a Meta-Refresh tag with a delay that redirects to the echo server, and the content is encoded, for example, using HTTP GET. That is, the content is encoded as part of the requested URL. The HTML page can also include a form prepopulated with the same content (either simply duplicated, or populated by a script that copies the content from the Meta-Refresh tag). Once the HTML page is loaded, the form is automatically submitted, for example via a web-based scripting language, to the echo server. The redirect results in the content, which was HTTP POST-ed to the echo server by the automatic form submission, to be displayed in the browser of the user device, as being served from the secondary domain.

In the event that scripting is not enabled on the user device, the Meta-Refresh will occur and the echo server request will take place with a HTTP GET. In particular, while web browsers and web browsing applications meant for interactive use have scripting enabled, "robot" browsers or applications (such as webcrawlers or RSS fetchers meant for use in automated data collection/aggregation) may have scripting disabled. Thus, browsers or applications with scripting enable may see a fast redirection via the <form> tag and HTTP POST, and "robot" browsers or applications may see a slower but JavaScript-free redirection via the Meta-Refresh and HTTP GET.

In another embodiment, non-browser clients, such as command line tools, may not be able to follow either sort of redirect. Nevertheless, since the response HTML contains the desired result (in the Meta-Refresh tag and in the form), these command line tools can parse out the content for display. In such embodiments, a command-line command or similar tool (e.g. one that is meant to simply execute a single command from either a command line or a shell script) may cause data to be returned that indicates a redirect along with where and how to access the desired result. A subsequent command or series of commands performed on this returned data (which may, in some cases, be stored on a storage medium such as a memory associated with a user device) may then enable acquisition and subsequent processing and/or presentation of the desired result.

FIG. 3a illustrates another exemplary embodiment of a system in which a data redirect is used when executing third party code in accordance with aspects of the disclosure. In this embodiment, the system can use local storage capability in browsers or applications at an end user device to avoid multiple transfers of content. The system of FIG. 3 includes, for example, an end user device 3010 with storage 3020, a first server 3040 associated with a first domain (e.g., Domain A) and a second server 3070 associated with a second domain (e.g., Domain B). It is appreciated that although a single end user and two servers (and two domains) are disclosed, the system is not limited to such an embodiment. Any number of user devices, servers, storage devices, domains, etc. may comprise the system. Moreover, each of the client devices, servers, storage, etc. may be connected via a network, such as the Internet, mobile data network(s), private networks, or other types of data connection schemes.

FIG. 3b is an exemplary flow of the system in FIG. 3b in accordance with aspects of the disclosure. With reference to the FIGS. 3a and 3b, when a user device 3010 requests network data such as a URL in a browser (300), the user device 3010 is directed to a server 3040 at a primary domain (e.g., Domain A). The server 3040 at Domain A executes the third party code and produces an output (302) which includes or otherwise indicates a result of the executable code. The server 3040 at Domain A responds with a script 3030 that stores the output in local storage 3020 on the user device and redirects 3050 to the secondary ("echo") server (304). The redirect 3050 is performed automatically by the application or browser on the user device 3010 and the "echo page" is served by a server 3070 of a second domain (e.g., Domain B) (306). The script 3060 on the "echo page" copies the output out of local storage 3020 and presents the information back in the browser on the user device 3010 (308).

In this case, for requests and data exchange using the HTTP standard, the primary domain sends back the content encoded in an HTML page, similar to the process described with respect to FIGS. 2a and 2b. However, rather than redirecting with the content included therein, an HTML5 local storage API may be used to save the content in the user's browser/application (e.g., local storage 3020). Then, the output can then be redirected 3050 to a page hosted on the second domain (for example, using Meta-Refresh or a script), without requiring a unique key or token. The echo server 3070 may then respond with a static page that includes a script 3060. The script 3060 locates the content that was saved by the primary domain in the local storage 3020, deletes it from the local storage, and displays the content at the user device 3010. The page from the second server/echo server 3070 does not change (it is a static page), it can be cached indefinitely. Therefore, after the first time that a user downloads the script 3060 from the secondary domain, it does not have to be downloaded again. The entire "redirection" process can then occur within the user's browser, without any network traffic to the secondary domain.

In one embodiment, shown in FIG. 3c, such a local storage technique may be combined with non-browser URL access requests, such as a request from a command-line or a script-based request being originated from a non-browser application. In such an embodiment, referring to FIGS. 3a and 3c, when a user device 3010 requests network data such as a URL in a (3100), the user device 3010 is directed to a server 3040 at a primary domain (e.g., Domain A). The server 3040 at Domain A executes the third party code and produces an output (3120) which includes or otherwise indicates a result of the executable code. The server 3040 at Domain A responds with a script 3030 that stores the output in local storage 3020 on the user device, the output including information about a redirect 3050 to the secondary ("echo") server (3140). The redirect 3050 is performed by parsing or otherwise processing the stored data on the user device 3010 and making a subsequent network data request for the "echo page" indicated in the redirect information, the "echo page" being served by a server 3070 of a second domain (e.g., Domain B) (3160). The script 3060 on the "echo page" may then read or otherwise accesses the output out of local storage 3020 and presents the information back in the browser on the user device 3010 (3180).

In variations where the browser or application on the user device 3010 does not have or support local storage, this redirection can be combined with the earlier described embodiments, by having scripts served by the primary domain include both capabilities and test for the local storage feature, falling back on the HTTP POST method via a <form> if local storage is not available, and on the HTTP GET method via the time-delayed Meta-Refresh if scripting is not available.

An example of such a storage conditional redirection process is shown in FIG. 3d. In one embodiment, a user device may request content, such as a URL via an HTTP request, from a first server at a first domain 310. The first server may then execute code included in or associated with the URL and generate an output 320 which includes or otherwise indicates a result of the executable code. A check may then be performed, either by the first server, the user device, or as part of the code execution or part of the output generation process, to determine whether there is local storage on the user device accessible to/by the browser or application on the user device that made the content request 340. Such local storage may be in the form of a hard drive, flash memory, removable storage media, processor cache, buffers, cloud-based storage, or any other form of data storage suitable for use in a data processing device.

If local storage is not available/accessible to the application or browser making the content request, the first server may respond with a redirect to the second server 330. The browser or application on the user device may then be redirected to the second server on the different domain 390, and the second server may output content to the browser or application from the redirect 380.

If local storage is available to the application or browser 340, the first server may respond with a script that stores output in the local storage and redirects to the second server 350. The browser or application on the user device may then be redirected to the second server on the different domain 360, and the script may copy or otherwise retrieve the stored output from the local storage and display the requested content on the user device 370 based on the retrieved stored output.

Further embodiments may also include a check for script execution capability either in the local storage check 340 or as an associated or predecessor test to determine whether a script-based output and redirect technique is suitable or appropriate. Some such embodiments may perform a check for scripting capability as part of or as a precondition to the content request 310 and may avoid use of local storage even in cases where such storage is available if the browser or application making the content request does not have scripting capability or if such scripting capability is de-activated or otherwise disabled.

Some embodiments of a local storage solution may use frame-based techniques such as an HTML iFrame to accomplish storage and presentation of the output produced as a result of the code execution. In such embodiments, a request to access a URL may be generated by a browser or application of a client or end-user device. The server on the first domain may respond with a trusted script that is stored in the browsers local storage. The first server then redirects to a static web page on a second domain. That static page may be cached and may contain an iframe set to a page of the first server. The iframe provides an API to allow access, via cross-domain communication, to the locally stored trusted script. The produced output may be read or acquired from the script (and subsequently destroyed or removed from local storage), the static page may then be cleared and the read output sent to the browser or application on the client or end-user device.

Figure 4A:
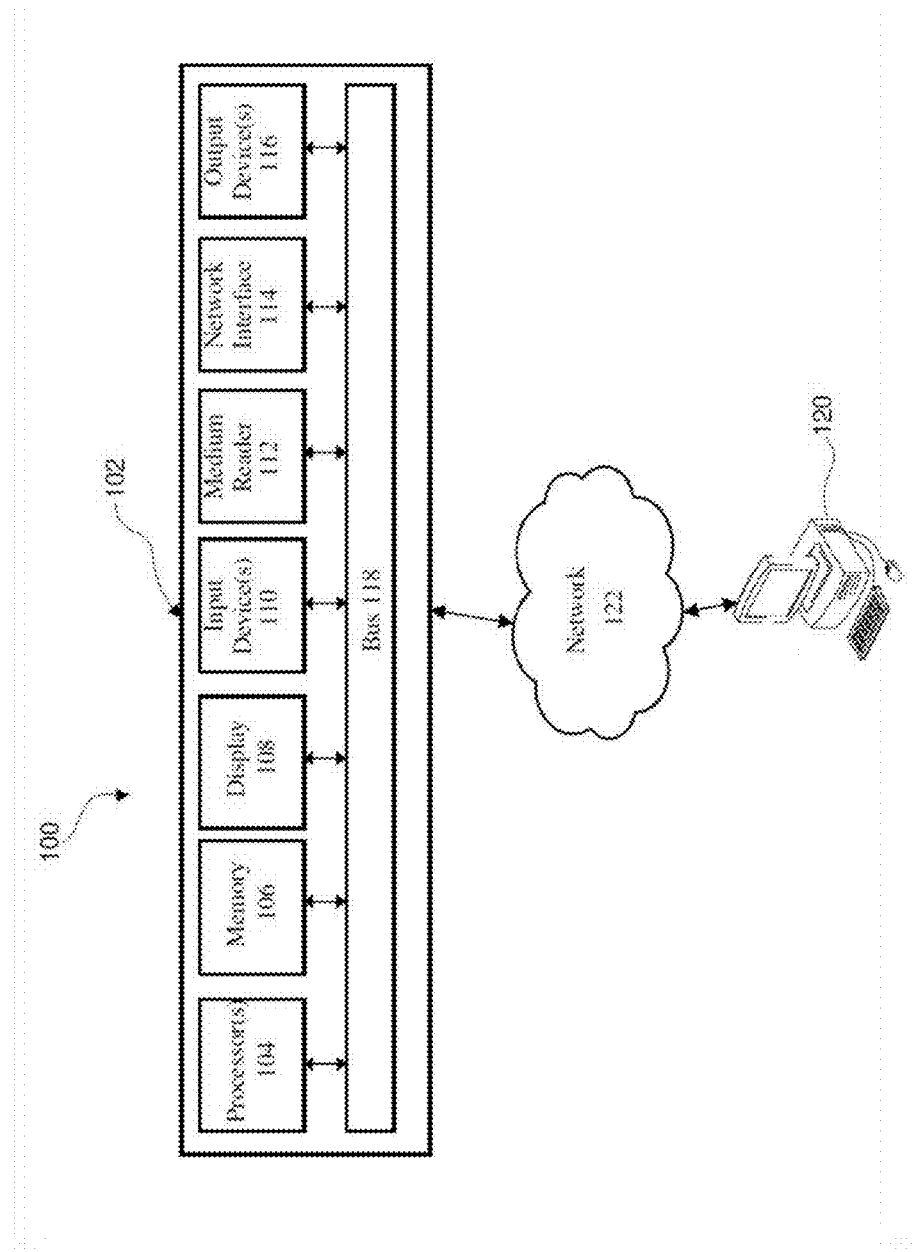
FIG. 4a is an exemplary system for use in accordance with the embodiments described herein.

FIG. 4a is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 4a, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, optical memory, removable memory, or any combination thereof.

As shown in FIG. 4a, the computer system 102 may include a computer display 108, such as a liquid crystal display, an organic light emitting diode, a flat panel display, a solid state display, a cathode ray tube, a plasma display, or other display type.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Various embodiments of the computer system 102 may include multiple input devices 110. Moreover, exemplary input devices 102 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 4a, the components may each be interconnected and communicate via an internal bus. However, any of the components may also be connected via an expansion bus. Moreover, the bus 118 may enable communication via any standard or other specification such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network. The network 122 is shown in FIG. 4a as a wireless network. However, the network 122 may also be a wired network or a combination of wired and wireless networks.

The additional computer device 120 is shown in FIG. 4a as a personal computer. However, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. The above-listed devices are merely exemplary devices and that the device 120 may be any additional device or apparatus without departing from the scope of the present application. Furthermore, the device 120 may be any combination of devices and apparatuses.

Figure 4B:
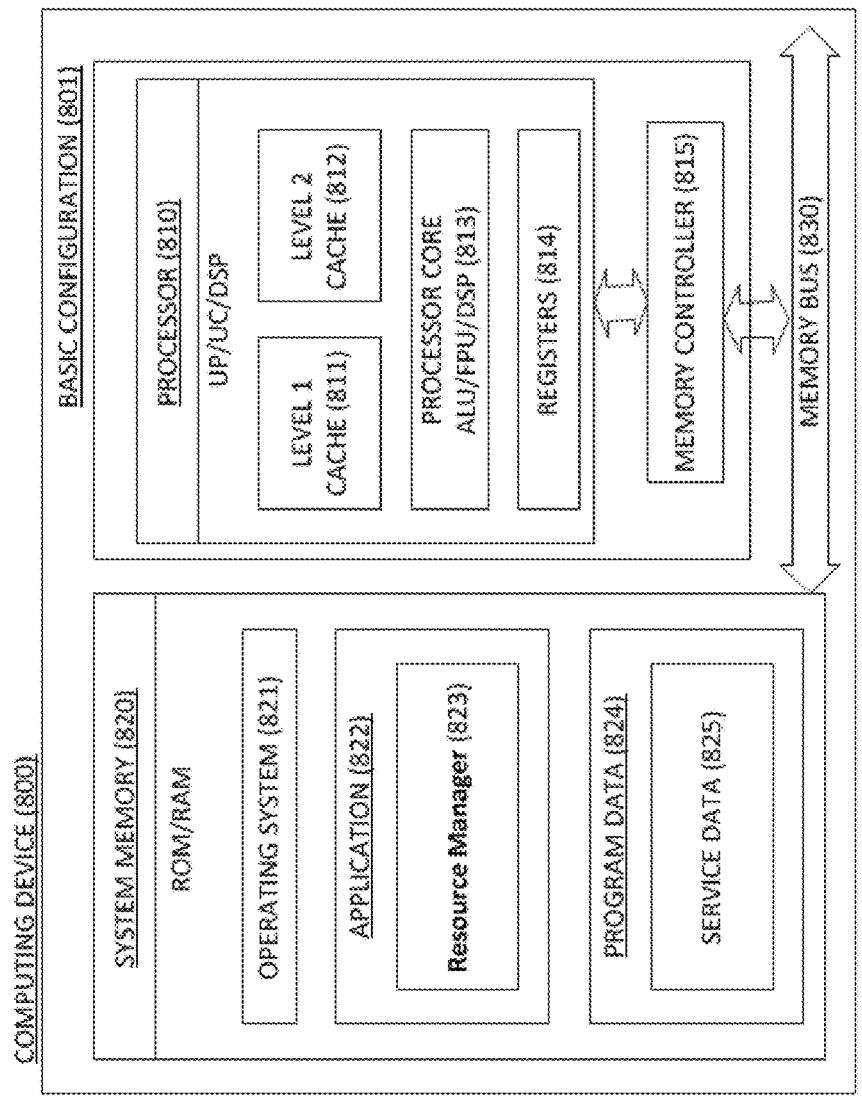
FIG. 4b is an exemplary system for use in accordance with the embodiments described herein.

FIG. 4b is a block diagram illustrating an exemplary computing device (800) that is arranged for data processing and/or executing applications such as web browsing or other forms of information exchange. Such a computing device (800) may represent or be used to create capabilities of part or all or multiple embodiments of a computer system 102 or computer device 120 of the type shown in FIG. 4a. In one configuration (801), the computing device (800) may include one or more processors (810) and system memory (820). A memory bus (830) can be used for communicating between the processor (810) and the system memory (820).

Depending on the desired configuration, the processor (810) can be of any type including but not limited to a microprocessor (μP), a microcontroller (μC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (804) (such as RAM), non-volatile memory (803) (such as ROM, flash memory, etc.) or any combination thereof. System memory (820) typically includes an operating system (821), one or more applications (822), and program data (824). The application (822) may include an application that can perform web browsing, script execution, and/or other forms of internet or network-based information processing and information exchange. In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (800) can also be implemented as a personal computer including both laptop computer and non-laptop computer configurations. The computing device (800) can also be implemented as a module or rack element in a server or server array, or as a processing module that is a virtual or logical construct representing a defined or otherwise measured portion of computing resources available within a data center. In such virtual machine variations, the computing device (800) may be an abstract representation of underlying hardware components having configurations similar to that of the computing device (800) but with different parameter or properties (such as more or fewer processors and/or memory, for example).

The above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Although the concept has been described with reference to several exemplary embodiments, it is understood that the words that have been used are words of description and illustration, rather than words of limitation. Changes may be made within the purview of the appended claims, as presently stated and as amended, without departing from the scope and spirit of the concepts discussed and described herein in their various aspects. Although the concepts have been described with reference to particular means, materials and embodiments, the concepts are not intended to be limited to the particulars disclosed; rather the concepts disclosed herein extend to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing a result of executing unverified, potentially malicious, or untested code from a first server at a first network domain to a requesting device over an information-exchange network, the method comprising:
receiving, at the first server at the first network domain, a content request from the requesting device, the content request including a request for the result of executing the unverified, potentially malicious, or untested code;
executing the code at the first server at the first network domain to produce an output that includes the requested result;
sending the produced output to a second server at a second network domain by providing, to the requesting device, the produced output as part of a redirection instruction to the second server to prevent the executed code from accessing domain resources from the first network domain; and
delivering the provided produced output to the requesting device via the second server, wherein the second server processes the provided produced output and delivers the processed produced output to the requesting device to prevent harmful or unexpected results from being accessed by the requesting device.

2. The method of claim 1, wherein the content request is an HTTP (hypertext transfer protocol) request for a URL (uniform resource locator) associated with a particular content item.

3. The method of claim 1, wherein the redirection instruction includes redirection data that indicates a redirect along with information about where and how to access the requested result; and
wherein the step of delivering includes processing the redirection data and receiving the requested result based on the redirection data.

4. The method of claim 1, wherein the step of delivering is performed by the second server, and wherein the step of delivering includes examining the provided produced output before sending the provided produced output to the requesting device.

5. The method of claim 1, wherein the requesting device is equipped with a local storage; and the step of sending the produced output includes sending a script that includes a representation of the produced output from the first server to the local storage; and the step of delivering the provided produced output to the requesting device includes retrieving the produced output from the local storage for presentation on the requesting device.

6. The method of claim 1, the method further comprising:

determining whether the requesting device is equipped with a local storage to store the produced output, wherein the step of determining is performed before the step of delivering;

in response to a determination that the requesting device is equipped with the local storage to store the produced output, performing the step of sending by sending a script that includes a representation of the produced output from the first server to the local storage; and performing the step of delivering the provided produced output to the requesting device by retrieving the produced output from the local storage for presentation on the requesting device.

7. The method of claim 2, wherein the step of sending the produced output is accomplished by producing an HTML page at the first server and including a Meta-Refresh tag in the produced HTML page, the Meta-Refresh tag redirecting the requesting device to the second server.

8. The method of claim 6, wherein the content request is an HTTP (hypertext transfer protocol) request for a URL (uniform resource locator) associated with a particular content item; and in response to a determination that the requesting device is not equipped with the local storage to store the produced output, performing the step of sending the produced output by producing an HTML page at the first server and including a Meta-Refresh tag in the produced HTML page, the Meta-Refresh tag redirecting the requesting device to the second server.

9. The method of claim 2, wherein the step of sending is accomplished by posting the requested result of the executed code in a payload at the first server and redirecting the posted payload to the second server.

10. The method of claim 9, wherein the second server examines the payload and returns the produced output to the requesting device as a response from the second network domain.

11. A non-transitory computer-readable medium having embodied thereon instructions which, when executed by a processor, cause the processor to perform a method of providing a result of executing unverified, potentially malicious, or untested code from a first server at a first network domain to a requesting device over an information-exchange network, the method comprising:

receiving, at the first server at the first network domain, a content request from the requesting device, the content request including a request for the result of executing the unverified, potentially malicious, or untested code;

executing the code at the first server at the first network domain to produce an output that includes the requested result;

sending the produced output to a second server at a second network domain by providing, to the requesting device, the produced output as part of a redirection instruction to the second server to prevent the executed code from accessing domain resources from the first network domain; and delivering the provided produced output to the requesting device via the second server, wherein the second server processes the provided produced output and delivers the processed produced output to the requesting device to prevent harmful or unexpected results from being accessed by the requesting device.

12. The medium of claim 11, wherein the content request is an HTTP (hypertext transfer protocol) request for a URL (uniform resource locator) associated with a particular content item.

13. The medium of claim 11, the method further comprising:

determining whether the requesting device is equipped with a local storage to store the produced output, wherein the step of determining is performed before the step of delivering;

in response to a determination that the requesting device is equipped with the local storage to store the produced output, performing the step of sending by sending a script that includes a representation of the produced output from the first server to the local storage; and performing the step of delivering the provided produced output to the requesting device by retrieving the produced output from the local storage for presentation on the requesting device.

14. The medium of claim 12, wherein the step of sending the produced output is accomplished by producing an HTML page at the first server and including a Meta-Refresh tag in the produced HTML page, the Meta-Refresh tag redirecting the requesting device to the second server.

15. The medium of claim 13, wherein the content request is an HTTP (hypertext transfer protocol) request for a URL (uniform resource locator) associated with a particular content item; and in response to a determination that the requesting device is not equipped with the local storage to store the produced output, performing the step of sending the produced output by producing an HTML page at the first server and including a Meta-Refresh tag in the produced HTML page, the Meta-Refresh tag redirecting the requesting device to the second server.

16. The medium of claim 12, wherein the step of sending is accomplished by posting the requested result of the executed code in a payload at the first server and redirecting the posted payload to the second server.

17. The medium of claim 16, wherein the second server examines the payload and returns the produced output to the requesting device as a response from the second network domain.

18. A system comprising:

a processor; and a processor-readable memory having stored therein instructions which, when executed by the processor, cause the processor to perform a method of receiving a result of executing unverified, potentially malicious, or untested code from a first server at a first network domain at a requesting device over an information-exchange network, the method comprising:

generating a content request from the requesting device to the first server at the first network domain, the content request including a request for the result of executing the unverified, potentially malicious, or untested code;

sending an output, produced by execution of the code at the first server at the first network domain, that includes the requested result to a second server at a second network domain by providing, from the requesting device, the produced output as part of a redirection instruction to the second server to prevent the executed code from accessing domain resources from the first network domain; and receiving the provided produced output at the requesting device from the second server, wherein the second server processes the provided produced output and delivers the processed produced output to the requesting device to prevent harmful or unexpected results from being accessed by the requesting device.

19. The system of claim 18, wherein the processor is disposed within a mobile computing device, and wherein the content request is initiated by an application operating on the mobile computing device.

20. The system of claim 18, wherein the processor-readable memory further includes a local storage disposed within the requesting device; and the step of sending the produced output includes receiving a script that includes a representation of the produced output from the first server at the requesting device and storing the received script in the local storage; and the step of receiving the provided produced output at the requesting device includes receiving an instruction from the second server to retrieve the produced output from the local storage for presentation on the requesting device.

* * * * *